United States Patent
Kamthe et al.

(10) Patent No.: US 10,812,545 B2
(45) Date of Patent: *Oct. 20, 2020

(54) BEACON SENSOR ADVERTISEMENT FRAME

(71) Applicant: Hewlett Packard Enterprise Development LP, Houston, TX (US)

(72) Inventors: Ankur Kamthe, Santa Clara, CA (US); Ben Dunsbergen, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,448

(22) Filed: Mar. 19, 2019

(65) Prior Publication Data

US 2019/0215348 A1 Jul. 11, 2019

Related U.S. Application Data (63) Continuation of application No. 15/338,091, filed on Oct. 28, 2016, now Pat. No. 10,237,313.

(51) Int. Cl.
*H04W 56/00* (2009.01)
*H04L 29/06* (2006.01)
(Continued)

(52) U.S. Cl.
CPC ...... *H04L 65/4076* (2013.01); *H04L 61/6022* (2013.01); *H04W 4/80* (2018.02); *H04W 8/005* (2013.01); *H04W 48/10* (2013.01)

(58) Field of Classification Search
CPC .. H04L 65/4076; H04L 61/6022; H04W 4/80; H04W 8/005; H04W 48/10
(Continued)

(56) References Cited

U.S. PATENT DOCUMENTS

2007/0242645 A1* 10/2007 Stephenson ....... H04W 52/0216
 370/338
2014/0171078 A1* 6/2014 Ryerson ................ H04W 48/18
 455/435.2
(Continued)

FOREIGN PATENT DOCUMENTS

| CN | 101480089 A | 7/2009 |
|---|---|---|
| CN | 101895822 A | 11/2010 |
| WO | WO-2016010347 | 1/2016 |

OTHER PUBLICATIONS

Bluetooth, "Specification of the Bluetooth System", Dec. 2, 2014, 3 pages, Covered Core Package version 4.2, Bluetooth SIG Inc., USA.

(Continued)

*Primary Examiner* — Sai Ming Chan
(74) *Attorney, Agent, or Firm* — Brooks, Cameron & Huebsch, PLLC (57) ABSTRACT

A beacon sensor device may include a communication resource to transmit a plurality of advertisement types. Each of the plurality of advertisement types may include a plurality of advertisement frames. The communication resource may further receive a connection request from a network device. The beacon sensor device may further include a processing resource and a memory resource storing machine-readable instructions. The machine-readable instructions may cause the processing resource to determine that the connection request is made in response to the transmission of a particular advertisement type of the plurality of advertisement type. The instructions may further cause the processing resource to determine the active services associated with the particular advertisement type and enable the services associated with the particular advertisement type.

17 Claims, 4 Drawing Sheets

(51) Int. Cl.
  H04W 8/00    (2009.01)
  H04W 48/10   (2009.01)
  H04W 4/80    (2018.01)
  H04L 29/12   (2006.01)

(58) Field of Classification Search
  USPC .......................................................... 370/312
  See application file for complete search history.

(56) References Cited

U.S. PATENT DOCUMENTS

| | | | | |
|---|---|---|---|---|
| 2014/0293978 | A1* | 10/2014 | Yang ..................... | H04W 8/005 370/338 |
| 2015/0172905 | A1 | 6/2015 | Kasslin et al. | |
| 2016/0157078 | A1 | 6/2016 | Palin et al. | |
| 2016/0184635 | A1* | 6/2016 | Kwon .................. | H04W 76/10 455/41.2 |
| 2017/0374629 | A1* | 12/2017 | Ramappa ................ | H04W 4/80 |

OTHER PUBLICATIONS

IEEE Computer Society, "IEEE Standard for Air Interface for Broadband Wireless Access Systems; IEE Std 802.16-2012", Aug. 17, 2012, 3 pages, IEEE, USA.

IEEE Computer Society, "IEEE Standard for Local and Metropolitan Area Networks: Overview and Architecture; IEEE Std 802-2014", Jun. 12, 2014, 18 pages, IEEE, USA.

IEEE Computer Society; "Part 11: Wireless LAN Medium Access Control (MAC) and Physical Layer (PHY) Specifications; IEEE Std 802.11-2012", Mar. 29, 2012; 63 pages, IEEE, USA.

USB Technology, http://vvww.usb.org/developers/docs/, "USB 3, 1 Specification", Jul. 26, 2013, 37 pages, USB Implementers Forum Inc, USA.

Wi-Fi Alliance, "VVi-Fi Certified Wi-Fi Direct: Personal, portable Wi-Fi to connect devices anywhere, anytime", Sep. 2014, 8 pages, WiFi Alliance, USA.

Wi-Fi Alliance, "Wi-Fi Peer-to-Peer (P2P) Technical Spec. V. 1.5", Aug. 4, 2014, 13 pages, WiFi Alliance, USA.

Wikipedia, https://en.wikipedia.org/wiki/Asynchronous_Transfer_Mode, "Asynchronous Transfer Mode", Dec. 31, 2014, 11 pages, Wikipedia, USA.

Wikipedia, https://enwikipedia.org/wiki/Internet_Protocol, "Internet Protocol", Jan. 1, 2015, 6 pages, Wikipedia, USA.

Argenox, "A BLE Advertising Primer", available online at <https://web.archive.org/web/20190121163331/https://www.argenox.com/bluetooth-low-energy-ble-v4-0-development/library/a-ble-advertising-primer/>, Jan. 21, 2019, 14 pages.

Radius Networks Support, "Configuring Developer Kit Beacons with Eddystone," available online at <https://support.radiusnetworks.com/hc/en-us/articles/205022884-How-do-I-configure-Eddystone-Developer-Kit-beacons>, retrieved in 2019, 12 pages.

* cited by examiner

BEACON SENSOR ADVERTISEMENT FRAME

CROSS-REFERENCE TO RELATED APPLICATIONS

This application is a continuation of U.S. patent application Ser. No. 15/338,091, filed on Oct. 28, 2016, the entire contents of which are incorporated by reference herein. The Applicant hereby rescinds any disclaimer of claim scope in the parent application or the prosecution history thereof and advises the USPTO that the claims in this application may be broader than any claim in the parent application(s).

BACKGROUND

Beacon sensor devices may facilitate connection with network devices by sending advertisement data frames. The advertisement data frames may be sent wirelessly to network devices. An advertisement data frame may correspond to a particular format. The beacon sensor device may continue to send advertisement data frames using the particular format.

DETAILED DESCRIPTION

Radio devices on wireless access points may use radio frequencies to advertise multiple basic service sets (BSSs) by broadcasting beacon frames. As used herein, 'access point' (AP) generally refers to receiving points for any known or convenient wireless access technology which may later become known. Specifically, the term AP is not intended to be limited to IEEE 802.11-based APs, APs generally function as an electronic device that is adapted to allow wireless devices to connect to a wired network via various communications standards. The beacon frames may advertise the different capabilities of each BSS. When a network device attempts to associate with the radio device, the network device may negotiate the capabilities to be used during the connection. In this way, a single wireless access point may advertise more than one BSS.

By contrast, a beacon sensor device, such as a Bluetooth Low Energy (BLE) compliant device, may be limited as to the number of services it can advertise. As used herein, a beacon sensor device refers to any type of device capable of transmitting and receiving advertisements and responses. That is, a BLE compliant device may be able to act in a limited role. For example, a BLE compliant device may behave as a broadcaster, or as a non-connectable advertiser. As used herein, a broadcaster refers to a beacon sensor device that is able to send advertisements but is not able to initiate or facilitate connections between itself and a network device. A BLE compliant device may behave as an observer. As used herein, an observer refers to a beacon sensor device that able to scan for advertisements but is unable to initiate or facilitate connections between itself and a network device. A BLE compliant device may behave as a peripheral device. As used herein, a peripheral device refers to a beacon sensor device that transmits advertisements and is able to facilitate connections between itself and a network device. A BLE compliant device operating as a peripheral device may operate as a slave in a single link-layer connection. Finally, a BLE compliant device may behave as a central device. As used herein, a central device refers to a beacon sensor device that is able to both scan for advertisements and initiate connections. Additionally, a BLE compliant device behaving as a central device may operate as a master in either a single or a multiple link-layer connection.

One reason a BLE compliant device may be limited to acting in a limited role is that each role may use a different format for beacon frames transmitted by the BLE compliant device. For example, a BLE compliant device behaving as a broadcaster may send a beacon frame designed to advertise the device, while a BLE compliant device behaving as a peripheral device may send a beacon frame designed to both advertise the device and facilitate connection to the device. Furthermore, a BLE compliant device behaving as an observer may not transmit any beacon frames but may receive advertisement frames.

Additionally, a BLE compliant device may be unable to transmit advertisement data frames that adhere to multiple formats. For example, a BLE compliant device may be able to transmit advertisement data frames that adhere to a first format but not to a second or third format. As a result, the BLE compliant device may not be able to communicate with network devices that use a format that is different than the format of the BLE compliant device. Said differently, a network device that is able to utilize two formats may receive an advertisement corresponding to the first format from a first BLE compliant device and may receive an advertisement corresponding to the second format from a second BLE compliant device, as opposed to receiving advertisements for both formats from a single BLE compliant device.

A beacon sensor device according to the present disclosure may behave as multiple beacon sensor devices. In some examples, the beacon sensor device may behave as multiple beacon sensor devices operating in peripheral mode. As outlined above, peripheral mode may allow the device to advertise the device and facilitate connection to the device. Said differently, a beacon sensor device according to the present disclosure may behave in a mode that allows a network device to connect to the beacon sensor device in response to receiving an advertisement transmitted by the beacon sensor device.

Moreover, a beacon sensor device according to the present disclosure may behave as multiple beacon sensor devices using different advertisement data frame formats. For example, a beacon sensor device according to the present disclosure may behave as a first beacon sensor device using a first format, a second beacon sensor device using a second format, and a third beacon sensor device using a third format. The beacon sensor device may cycle through each of the formats, thus allowing regular transmission of each format of advertisement data frame.

Figure 1:
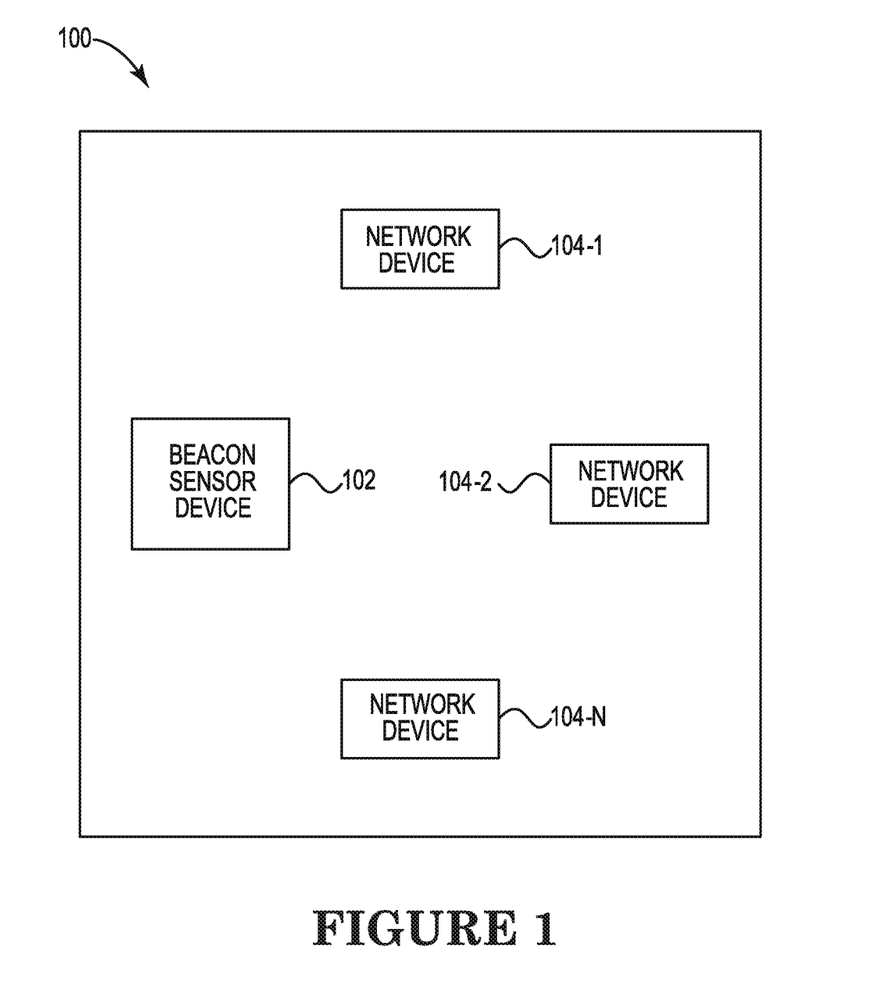
FIG. 1 illustrates an example environment for a beacon sensor device according to the disclosure.

FIG. 1 illustrates an example environment 100 for a beacon sensor device. As shown in FIG. 1, environment 100 may include multiple components. Environment 100 may include a beacon sensor device 102. Further discussion of beacon sensor device 102 is presented herein with regards to FIG. 2.

FIG. 1 may further include a plurality of network devices 104-1, 104-2 . . . 104-N (referred to collectively hereinafter as network devices 104). As used herein, a network device generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, 'information' is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells. Network devices 104 may receive transmissions, such as advertisement frames or scan responses, from beacon sensor device 102. Further discussion regarding the transmissions is presented herein with regards to FIGS. 3 and 4.

Figure 2:
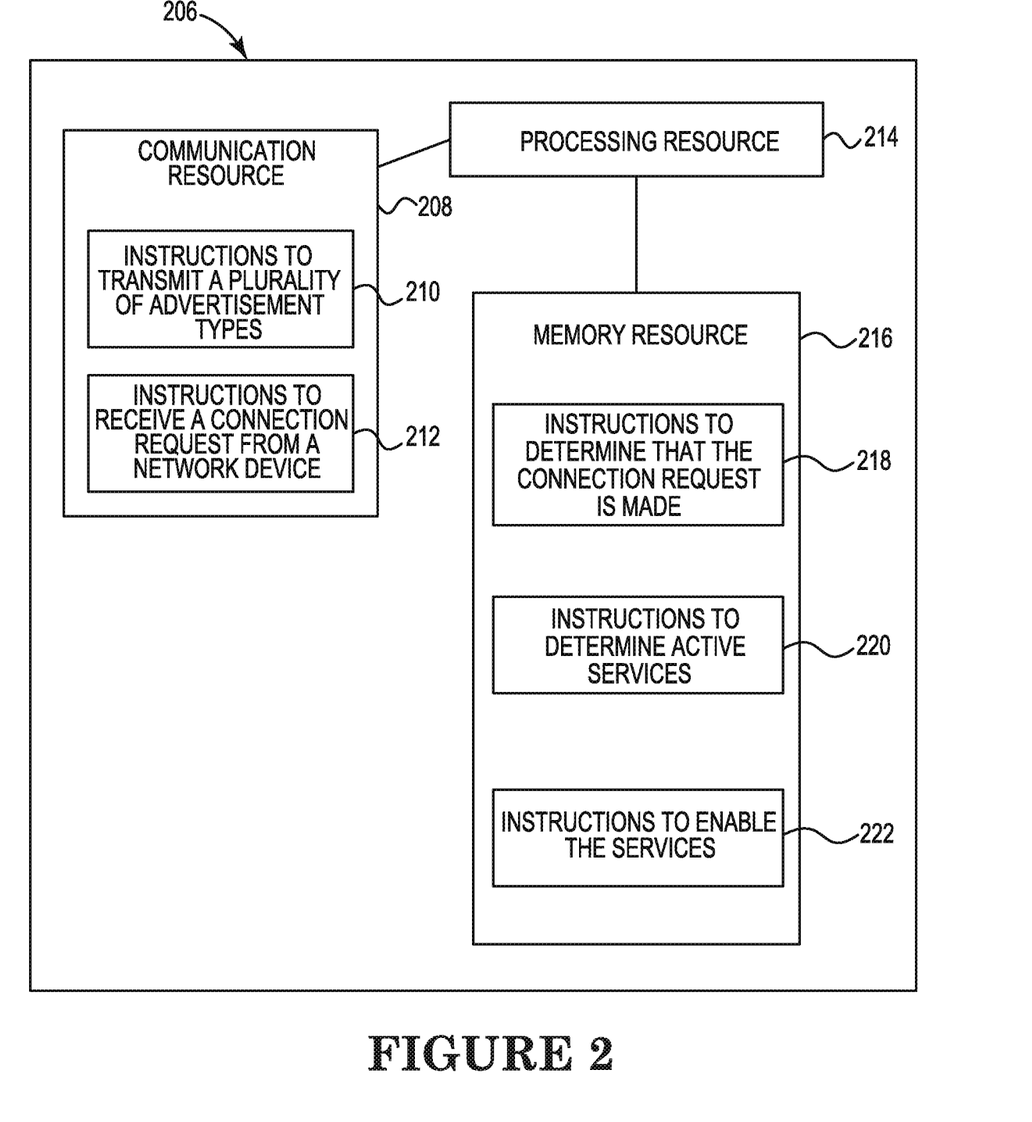
FIG. 2 illustrates an example of a beacon sensor device according to the disclosure.

FIG. 2 illustrates an example beacon sensor device 206 according to the disclosure. Beacon sensor device 206 may be any type of device capable of transmitting and receiving advertisements and responses. In some examples, beacon sensor device 206 may be a Bluetooth Low Energy (BLE) compliant device. As shown in FIG. 2, beacon sensor device 206 may include multiple components. For example, beacon sensor device 206 may include a communication resource 208. As used herein, a communication resource refers to hardware to transmit and/or receive communications. Communication resource 208 may be hardware device suitable for retrieval and execution of instructions such as instructions 210 and/or 212.

In some examples, instructions 210, when executed by communication resource 208, may cause communication resource 208 to transmit a plurality of advertisement types. As used herein, an advertisement type refers to a category of data packet sent by a beacon sensor device. For example, an advertisement type may correspond to a proximity beacon or a location beacon. A proximity beacon may notify beacon sensor device 206 when a network device comes within a proximity of the beacon sensor device 206, while a location beacon may transmit beacons to triangulate the location of a network device.

Each of the advertisement types sent by communication resource 208 in response to instructions 210 may include a plurality of advertisement frames. As used herein, an advertisement frame refers to a data packet corresponding to a particular advertisement type. An advertisement frame may include multiple parts. For example, an advertisement frame may include a preamble to manage internal protocols. Each type of advertisement may have a different preamble. An advertisement data frame may further include an access address. In some examples, the access address may be a Media Access Control (MAC) address. Each type of advertisement frame may have a unique access address.

An advertisement data frame may further include a Packet Data Unit (PDU). A PDU corresponds to the payload of the advertisement data frame. Different types of advertisement data frames may use different PDUs. For example, an advertisement data frame that advertises a network device may use one type of PDU, while an advertisement data frame for data transmission may use a second type of PDU. An advertisement data frame may also include a Cyclic Redundancy Code (CRC). As used herein, a CRC refers to a portion of an advertisement data frame that detects errors.

Instructions 212, when executed by communication resource 208, may cause communication resource 208 to receive a connection request from a network device. The connection request may be made in response to the network device receiving at least one of the transmitted advertisement types. In response to the connection request, communication resource 208 may connect to the network device or may cause the processing resource 214 to connect beacon sensor device 206 and the network device.

Beacon sensor device 206 may further include a processing resource 214 and a memory resource 216. Although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 214 may be a central processing unit (CPU), a semiconductor based microprocessor, and/or other hardware devices suitable for retrieval and execution of instructions stored in memory resource 216. Processing resource 204 may fetch, decode, and execute instructions 218, 220, 222, or a combination thereof. As an alternative or in addition to retrieving and executing instructions, processing resource 214 may include at least one electronic circuit that includes electronic components for performing the functionality of instructions 218, 220, 222, or a combination thereof.

Memory resource 216 may be any electronic, magnetic, optical, or other physical storage device that stores executable instructions. Thus, memory resource 216 may be, for example, Random Access Memory (RAM), an Electrically-Erasable Programmable Read-Only Memory (EEPROM), a storage drive, an optical disc, and the like. Memory resource 216 may be disposed within beacon sensor device 206, as shown in FIG. 2. In this situation, the executable instructions may be "installed" on the beacon sensor device 206. Additionally and/or alternatively, memory resource 216 may be a portable, external or remote storage medium, for example, that allows beacon sensor device 206 to download the instructions from the portable/external/remote storage medium. In this situation, the executable instructions may be part of an "installation package". As described herein, memory resource 216 may be encoded with executable instructions for a beacon sensor device.

Beacon sensor device 206 may include instructions 218 to cause a processing resource, such as processing resource 214, to determine that a connection request has been made. In some examples, the connection request may be made in response to transmission of an advertisement frame by communication resource 202 in response to instructions 210. As described previously, instructions 212 may cause communication resource 208 to receive a connection request from a network device. Communication resource 208 may then transmit the connection request to processing resource 214.

In some examples, instructions 218 may include instructions to determine that the connection request was made in response to the transmission of a particular advertisement type of the plurality of advertisement types transmitted by communication resource 208. For example, communication resource 208 may transmit advertisement types A, B, and C. Communication resource 208 may then receive a connection request from a network device responding to advertisement type B. In such an example, instructions 218 may cause processing resource 214 to determine that the connection request was made in response to advertisement type B.

Beacon sensor device 206 may further include instructions 220 to cause a processing resource, such as processing resource 214, to determine the active services associated with the particular advertisement type. As used herein, a service refers to a collection of characteristics operating together to perform a function. A characteristic refers to a data value transferred between the client, or network device, and the server, or beacon sensor device. In some examples, the services may correspond to services offered by a Generic Attribute Protocol (GATT). As used herein, an active service refers to a particular service associated with a particular advertisement type.

Each of the plurality of advertisement types may have a particular set of associated active services. For example, advertisement type A may have services 1, 2, and 3 active, advertisement type B may have services 4, 5, and 6 active, and advertisement type C may have services 7, 8, 9, and 10 active. In such an example, beacon sensor device 206 would have ten total services available. Each advertisement type then may utilize a subset of the total services available to the beacon sensor device.

Beacon sensor device 206 may further include instructions 222 to cause a processing resource, such as processing resource 214, to enable the services associated with the particular advertisement type. As used herein, enabling a service refers to activating a particular service. Said differently, enabling a service refers to "turning on" the particular service. In some examples, the particular advertisement type may be determined at 218. Further, the active services associated with the particular advertisement type may be determined at 220. For example, advertisement type B may be determined to be the advertisement type that led to a connection request at 218. Services 4, 5, and 6 may then be determined to be the active services associated with advertisement type B at 220. Then, at 222, services 4, 5, and 6 may be enabled.

Instructions 222 may further include instructions to determine that a plurality of the total available services are not associated with the particular advertisement type. For example, advertisement type B does not have services 1-3 and 7-10 associated with it. Instructions 222 may determine that these seven services are not used with advertisement type B. Instructions 222 may then cause processing resource 214 to disable the plurality of services that are not used with the particular advertisement type. As used herein, disabling a service refers to deactivating the service. Said differently, disabling a service refers to "turning off" the service. For example, as services 1-3 and 7-10 are not associated with advertisement type B, instructions 222 may cause processing resource 204 to disable services 1-3 and 7-10, while enabling services 4, 5, and 6.

Figure 3:
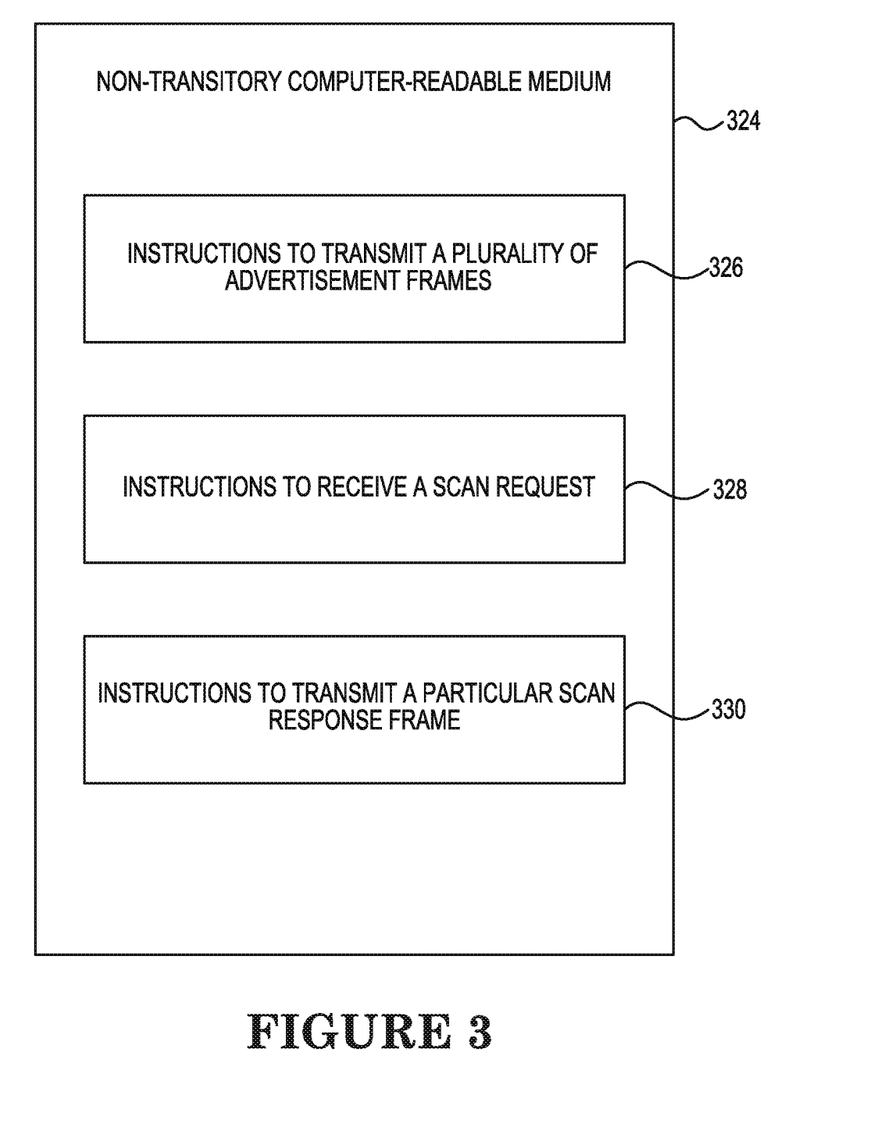
FIG. 3 illustrates an example of a medium for a beacon sensor device according to the disclosure.

FIG. 3 illustrates an example of medium 324 for a beacon sensor device according to the disclosure. As described herein, the components illustrated in FIG. 3 may perform a number of functions related to a beacon sensor. Although the following descriptions refer to a single processing resource and a single computer readable storage medium 324, the descriptions may also apply to a system including multiple processing resources and multiple computer readable storage mediums. In such examples, the medium 324 may be distributed across multiple computer readable storage mediums and multiple processing resources. Put another way, the instructions executed in the medium 324 may be stored across multiple machine-readable storage mediums and executed across multiple processing resources, such as in a distributed or virtual computing environment.

As illustrated in FIG. 3, the medium 324 may comprise a non-transitory machine-readable storage medium 324 storing machine readable instructions to cause a processing resource (not illustrated in FIG. 3) to perform a number of operations relating to a beacon sensor device. The processing resource may be a central processing unit (CPU), microprocessor, and/or other hardware device suitable for retrieval and execution of instructions stored in machine-readable storage medium 324.

The medium 324 may include instructions 326 to cause the processing resource to transmit a plurality of advertisement frames. In some examples, the plurality of advertisement frames may be transmitted by a beacon sensor device, such as beacon sensor device 206, described previously with respect to FIG. 2. In some examples, each of the plurality of advertisement frames may have a unique payload.

Instructions 326 may include instructions to transmit a first advertisement frame. The first advertisement frame may have a first MAC address and a first payload format corresponding to the first MAC address. Once the first advertisement frame has been transmitted, instructions 326 may cause the processing resource to change the first MAC address, corresponding to the first advertisement frame, to a second MAC address that is different than the first MAC address. The second MAC address may correspond to a second advertisement frame. In addition, the second advertisement frame may have a second payload format that is different than the first payload format. Thus, the second advertisement frame may have both a second MAC address that is different than the first MAC address and a second payload format that is different than the first payload format. Instructions 326 may then include instructions to transmit the second advertisement frame, wherein the second advertisement frame is different than the first advertisement frame.

In some examples, instructions 326 may include instructions to cycle through each of the plurality of advertisement frames at a rate of once every transmission rate interval. As used herein, a transmission rate interval refers to a time to send at least one frame of the plurality of advertisement frames. In some examples, a transmission rate interval may correspond to a time to send a first type of advertisement frame of the plurality of advertisement frames. In such examples, the remaining plurality of advertisement frames may be sent in the time between transmissions of the first type of advertisement frame. For example, a beacon sensor device may be transmitting three types of advertisement frames: A, B, and C. Advertisement type A may have a transmission rate interval of 0.06 seconds. Thus, every 0.06 seconds, the beacon sensor device may complete a cycle and transmit a new advertisement type A frame. Advertisement types B and C, then, may have corresponding frames transmitting between the transmissions of advertisement frame type A. In some examples, each type of advertisement frame type may be transmitted at a regular interval less than the transmission rate interval. For example, if advertisement frame type A has a transmission rate interval of 0.06 seconds and there are three total advertisement frame types (A, B, and C), one type of advertisement frame may be transmitted every 0.02 seconds. However, examples, are not so limited, and any transmission rate interval may be used.

The medium 324 may include instructions 328 to cause the processing resource to receive a scan request. In some examples, the scan request may be received in response to the transmission of a particular advertisement frame of the plurality of advertisement frames transmitted at 326. The scan request may be transmitted to medium 324 by a network device (not shown in FIG. 3). As described previously with reference to FIG. 2, a scan request may be received by a communication resource, such as communication resource 208.

Instructions 328 may include instructions to determine that the received scan request is made in response to a particular advertisement frame of the plurality of advertisement frames. For example, medium 324 may be transmitting advertisement frames A, B, and C at regular intervals as described previously. A scan request may be made in response to receiving one of the advertisement frames. Instructions 328 may thus include instructions to determine which of the plurality of advertisement frames the scan request corresponds to.

The medium 324 may further include instructions 330 to cause the processing resource to transmit a particular scan response frame. In some examples, the particular scan response frame may be transmitted in response to receiving a scan request at 328. The particular scan response frame may include a payload that corresponds to the payload of the particular advertisement frame. Said differently, a scan request may be received in response to a particular advertisement frame containing a particular payload. The scan response frame may correspond to the particular advertisement frame and have the same or a corresponding particular payload. As described previously, each of the plurality of advertisement frame types may have a unique payload: thus, a particular scan response frame may correspond to one type of the plurality of advertisement frames. In some examples, the particular scan response frame may further have a particular MAC address corresponding to the particular advertisement frame type. As described previously, both the MAC address and the payload may be unique for each of the plurality of advertisement frame types.

In some examples, instructions 330 may transmit the particular scan response frame to the network device that sent the scan request. The scan response frame may allow the network device to connect with the medium 324. In some examples, the transmitted scan response frame may allow medium 324 to locate the network device that sent the scan request. In other examples, the transmitting scan response frame may deny the network device's request to connect with the medium 324.

Figure 4:
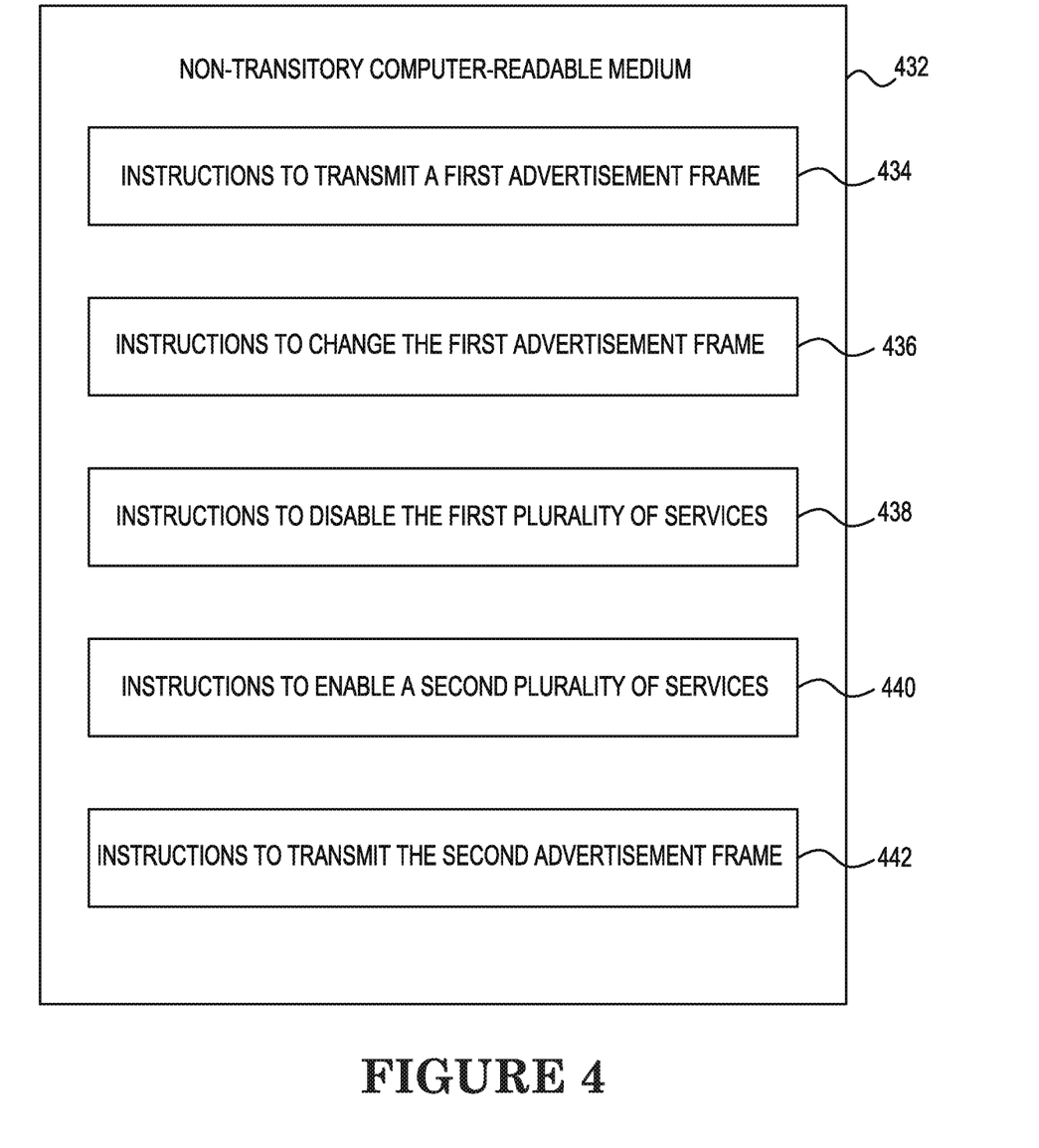
FIG. 4 illustrates another example of a medium for a beacon sensor device according to the disclosure.

FIG. 4 illustrates another example of a medium 432 for a beacon sensor device according to the disclosure. As shown in FIG. 4, medium 432 may include multiple components. Medium 432 may include a non-transitory computer-readable medium 432. Non-transitory computer-readable medium 432 may be akin to non-transitory computer-readable medium 324, discussed previously with respect to FIG. 3. Non-transitory computer-readable medium 432 may store instructions, such as instructions 434, 436, 438, 440, and/or 442, which may be executed by a processing resource (not shown in FIG. 4).

The medium 432 may include instructions 434 to cause the processing resource to transmit a first advertisement frame. In some examples, the first advertisement frame may be transmitted by a beacon sensor, such as beacon sensor device 102 or 206, discussed previously with respect to FIGS. 1 and 2. As described previously, a first advertisement frame may have a first plurality of services enabled. The first plurality of services may be GATT services and may represent a subset of a total number of available services. The first plurality of services may correspond to the services for the payload of the first advertisement frame.

The medium 432 may include instructions 436 to cause the processing resource to change the first advertisement frame. In some examples, instructions 436 may include instructions to change the MAC address of the first advertisement frame to a second MAC address that is different than the first MAC address. Instructions 436 may further include instructions to change the payload format of the first advertisement frame to a second payload format corresponding to the second advertisement frame. The second payload format may be different than the first payload format. The combination of the second MAC address and the second payload format may correspond to a second advertisement frame that is different than the first advertisement frame.

The medium 432 may include instructions 438 to cause the processing resource to disable the first plurality of services. As described previously, the first advertisement frame transmitted at 434 may include a first plurality of services enabled. In some examples, the first plurality of services may be disabled based on a determination that the first MAC address and/or the first payload format have been changed. Said differently, the first plurality of services may be disabled based on a determination that the first advertisement frame type has been changed to a second advertisement frame type.

The medium 432 may include instructions 438 to cause the processing resource to disable the first plurality of services. As described previously, the first advertisement frame transmitted at 434 may include a first plurality of services enabled. In some examples, the first plurality of services may be disabled based on a determination that the first MAC address and/or the first payload format have been changed. Said differently, the first plurality of services may be disabled based on a determination that the first advertisement frame type has been changed to a second advertisement frame type.

Instructions 440 may further include instructions to determine a subset of a total number of services to be enabled based on the second advertisement frame. The subset of the total number of services may include services that were enabled for the first advertisement frame, or the subset of the total number of services may be different than the services enabled for the first advertisement frame. In some examples, instructions 440 may include instructions to determine that the second MAC address corresponding to the second advertisement frame includes at least one new service to be enabled. Instructions 440 may then include instructions to enable the subset of services determined to correspond to the second advertisement frame.

The medium 432 may include instructions 442 to cause the processing resource to transmit the second advertisement frame. In some examples, the second advertisement frame may be transmitted by a beacon sensor, such as beacon sensor device 102 or 206, discussed previously with respect to FIGS. 1 and 2. As described previously, the second advertisement frame may have a different MAC address and/or payload format than the first advertisement frame transmitted at 434. Additionally, as described previously, the second advertisement frame may have a second plurality of services enabled that is different than the first plurality of services.

The medium 432 may further include instructions to cause the processing resource to change the second advertisement frame to a third advertisement frame. In some examples, the instructions to change the second advertisement frame to a third advertisement frame may include instructions to change the second MAC address to a third MAC address. The third MAC address may be different than both the first MAC address and the second MAC address. Additionally, the instructions to change the second advertisement frame to a third advertisement fame may include instructions to change the second payload format to a third payload format. The third payload format may be different than both the first payload format and the second payload format. Said differently, the third advertisement frame may be different than the first advertisement frame and the second advertisement frame.

The medium 432 may further include instructions to cause the processing resource to disable the second plurality of resources enabled at 440. In some examples, the second plurality of resources may be disabled based on a determination that the second advertisement format has changed to a third advertisement format. The medium 432 may include instructions to cause the processing resource to enable a third plurality of services. In some examples, the third plurality of resources may correspond to the third advertisement frame. The third plurality of services may be a third subset of a total number of services available and may be different than the first subset of services and/or the second subset of services.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to any number of such elements and/or features.

What is claimed:

1. A beacon sensor device, comprising:
   a processing resource; and
   a memory resource comprising instructions executable by the processing resource to:
      transmit a plurality of types of advertisement frames, wherein each of the plurality of types of advertisement frames has a unique access address, wherein the instructions to transmit the plurality of types of advertisement frames comprise instructions to:
         transmit a first type of advertisement frames, wherein the first type of advertisement frames has a first access address;
         change the first access address to a second access address;
         transmit a second type of advertisement frames, wherein the second type of advertisement frames has the second access address;
      receive a connection request from a network device;
      determine that the connection request has been made in response to transmission of a particular type of advertisement frames of the plurality of types of advertisement frames; and
      based on the determination that the connection request has been made in response to transmission of the particular type of advertisement frames, enable one or more active services associated with the particular type of advertisement frames.

2. The beacon sensor device of claim 1, wherein each of the plurality of types of advertisement frames comprises a different preamble.

3. The beacon sensor device of claim 1, wherein each of the plurality of types of advertisement frames comprises a different type of Packet Data Unit (PDU).

4. The beacon sensor device of claim 1, wherein the one or more active services associated with the particular type of advertisement frames are a subset of total services available to the beacon sensor device.

5. The beacon sensor device of claim 1, wherein the instructions comprise instructions to:
   based on the determination that the connection request has been made in response to transmission of the particular type of advertisement frames, disable one or more available services not associated with the particular type of advertisement frames.

6. The beacon sensor device of claim 1, wherein the instructions comprise instructions to accept the connection request from the network device.

7. The beacon sensor device of claim 1, wherein the beacon sensor device is a Bluetooth Low Energy (BLE) compliant device.

8. A method, comprising:
   transmitting, by a beacon sensor device, a plurality of advertisement frames, wherein each of the plurality of advertisement frames has a unique access address, wherein transmitting the plurality of advertisement frames comprises:
      transmitting, by the beacon sensor device, a first advertisement frame, wherein the first advertisement frame has a first access address;
      changing the first access address to a second access address;
      transmitting, by the beacon sensor device, a second advertisement frame, wherein the second advertisement frame has the second access address;
   receiving a scan request from a network device;
   determining, by the beacon sensor device, that the received scan request is in response to a particular advertisement frame of the plurality of advertisement frames transmitted by the beacon sensor device; and
   based on the determination that the received scan request is in response to the particular advertisement frame, enabling, by the beacon sensor device, one or more active services associated with the particular advertisement frame.

9. The method of claim 8, wherein each of the plurality of advertisement frames has a unique payload format.

10. The method of claim 8, wherein transmitting the plurality of advertisement frames comprises cycling through each of the plurality of advertisement frames at a rate of once every transmission rate interval.

11. The method of claim 8, further comprising:
   based on the determination that the received scan request is in response to the particular advertisement frame, disabling, by the beacon sensor device, one or more available services not associated with the particular advertisement frame.

12. The method of claim 8, further comprising transmitting, by the beacon sensor device, a scan response frame in response to receiving the scan request from the network device.

13. The method of claim 12, wherein the scan response frame has an access address corresponding to the particular advertisement frame.

14. The method of claim 12, further comprising allowing the network device to connect to the beacon sensor device, based on the transmitted scan response frame by the beacon sensor device.

15. A non-transitory computer-readable medium containing instructions executable by a processor to cause the processor to:
   transmit, by a beacon sensor device, a plurality of types of advertisement frames, wherein each of the plurality of types of advertisement frames has a unique access address, wherein the instructions to transmit the plurality of types of advertisement frames comprises instructions to:
      transmit, by the beacon sensor device, a first type of advertisement frames, wherein the first type of advertisement frames has a first access address;
      change the first access address to a second access address;
      transmit, by the beacon sensor device, a second type of advertisement frames, wherein the second type of advertisement frames has the second access address;
   receive a scan request;
   determine, by the beacon sensor device, that the received scan request is made in response to a particular type of advertisement frames of the plurality of types of advertisement frames transmitted by the beacon sensor device; and
   based on the determination that the received scan request is made in response to the particular type of advertisement frames, enable, by the beacon sensor device, one or more services associated with the particular type of advertisement frames.

16. The non-transitory computer-readable medium of claim 15, wherein the instructions comprise instructions to:
   based on the determination that the received scan request is made in response to the particular type of advertisement frames, disable, by the beacon sensor device, one or more available services not associated with the particular type of advertisement frames.

17. The non-transitory computer-readable medium of claim 15, wherein the instructions comprise instructions to transmit, by the beacon sensor device, a scan response frame in response to the received scan request.

* * * * *